US008176502B2

(12) United States Patent
Srinivasan et al.

(10) Patent No.: US 8,176,502 B2
(45) Date of Patent: May 8, 2012

(54) APPARATUS AND METHOD FOR MAINTAINING SCRIPT LOGS ACROSS MULTIPLE FRAMES AND WORKFLOWS

(75) Inventors: Manikandan Srinivasan, Fremont, CA (US); Baskaran Manivannan, Fremont, CA (US); Yohann Richard, Cupertino, CA (US)

(73) Assignee: SAP France S.A., Paris (FR)

( * ) Notice: Subject to any disclaimer, the term of this patent is extended or adjusted under 35 U.S.C. 154(b) by 1103 days.

(21) Appl. No.: 12/040,772

(22) Filed: Feb. 29, 2008

(65) Prior Publication Data

US 2009/0222840 A1 Sep. 3, 2009

(51) Int. Cl.
*G06F 15/163* (2006.01)
(52) U.S. Cl. ........................................ 719/318; 717/115
(58) Field of Classification Search .................. 717/115; 719/318, 320
See application file for complete search history.

(56) References Cited

U.S. PATENT DOCUMENTS

| 6,393,407 B1* | 5/2002 | Middleton et al. ......... 705/14.73 |
| 6,704,732 B1* | 3/2004 | Barclay ................................ 1/1 |
| 2003/0149799 A1* | 8/2003 | Shattuck et al. .............. 709/318 |
| 2004/0215715 A1* | 10/2004 | Ehrich et al. .................. 709/203 |
| 2006/0085420 A1* | 4/2006 | Hwang ............................ 707/10 |
| 2007/0198944 A1* | 8/2007 | Viswanathan et al. ........ 715/778 |
| 2008/0294670 A1* | 11/2008 | Borissov et al. .............. 707/102 |

OTHER PUBLICATIONS

Flanagan, D., "JavaScript: The Definitive Guide, Third Edition" (Jun. 1998), O'Reilly & Associates, Inc., pp. 228-255, 284-299.*
Atterer, R.; Wnuk, M.; Schmidt, A., "Knowing the User's Every Move—User Activity Tracking for Website Usability Evaluation and Implicit Interaction," (May 23-26, 2006), Proceedings of the 2006 International World Wide Webe Conference Committee, pp. 203-212 [retrieved from http://portal.acm.org/citation.cfm?id=1135811 on Jul. 26, 2011].*
Lemay, L., "Teach Yourself Web Publishing With HTML 3.2 in 14 Days" (1996), Sams.net Publishing, pp. 394-398.*

* cited by examiner

*Primary Examiner* — H. S. Sough
*Assistant Examiner* — Brian Wathen
(74) *Attorney, Agent, or Firm* — Mintz, Levin, Cohn, Ferris, Glovsky and Popeo, P.C.

(57) ABSTRACT

A computer readable storage medium includes executable instructions to provide a scripting language framework. A script is run within the scripting language framework. The script defines an application characterized by a hierarchy of frames in a user interface window. A sub-frame log for a sub-frame in the hierarchy of frames is captured. The log is stored in a top log of a top frame of the hierarchy of frames.

18 Claims, 5 Drawing Sheets

APPARATUS AND METHOD FOR MAINTAINING SCRIPT LOGS ACROSS MULTIPLE FRAMES AND WORKFLOWS

FIELD OF THE INVENTION

This invention relates generally to creating and maintaining computer applications. More particularly, this invention relates to storing and displaying a set of related script logs.

BACKGROUND OF THE INVENTION

Business Intelligence generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information; content delivery infrastructure systems to deliver, store and manage reports and analytics; data warehousing systems to cleanse and consolidate information from disparate sources; and integration tools to analyze and generate workflows based on enterprise systems. Business Intelligence tools work with database management systems to organize, store, retrieve and manage data in databases. Business Intelligence tools include performance management applications to provide business metrics, dashboards, and scorecards, as well as best-practice analysis techniques for gaining business insights.

In many organizations establishing business strategies is an increasingly complex exercise. There are ongoing efforts to supply quantitative tools to enhance business strategy decision making. In particular, there is an increasing focus on Performance Management applications that provide a quantitative framework for monitoring and analyzing various business metrics. A business metric is a measure used to evaluate a quantifiable component of an organization's activities. For example, business metrics may include return on investment, revenues, sales volume, inventory levels, cycle times, supply chain costs, number of customers, and so on.

There are a number of commercially available tools that can monitor various metrics in stand-alone Performance Management applications or packages integrated into the tools. For example, Business Objects, an SAP company, of San Jose, Calif., sells a number of widely used Business Intelligence and Performance Management tools that can monitor metrics, including Crystal Xcelsius™ BusinessObjects Performance Manager™, BusinessObjects Enterprise™, BusinessObjects XI™, and BusinessObjects Dashboard Builder™. These tools include various frameworks for monitoring, including visualization frameworks such as performance dashboards and scoreboards.

Dashboards provide a consistent way to track actual activity and results with benchmarks and thresholds to measure against. With dashboards and scoreboards, each employee and department can view the metrics that are important to them and manage individual targets (e.g., sales by region, cost of sales, profit margin) so they can improve performance, speed, and effectiveness. Those targets can then be rolled up across functional areas, departments, and business lines to provide high-level views of the organization's performance. Because the metric or metrics can be complex dashboards typically include multiple information panes.

JavaScript is a scripting language most often used for client-side web development. JavaScript is used to write functions that are embedded in HTML pages or frames. Frames are portions of pages. JavaScript is a suitable scripting language for creating dashboards. A dashboard can be displayed within a browser window. Each dashboard is typically composed of multiple frames that may be hierarchically arranged with a top frame including one or more children each of these including zero or more children frames. Each information pane can correspond to a frame in the browser window.

Script logs are valuable to a dashboard designer and others. The log for a frame is maintained when the frame is open. These logs are tied to the frame, which means that if the frame is redirected to another Universal Resource Identifier (URI) the log is lost. In addition if the frame is closed the log is lost.

Accordingly, it would be desirable to provide techniques to address the shortcomings of existing tools to design Performance Management tools. In particular, it would be desirable to provide a technique to capture and record the logs from all frames within a dashboard tool.

SUMMARY OF THE INVENTION

The invention includes a computer readable storage medium with executable instructions to provide a scripting language framework. A script is run within the scripting language framework. The script defines an application characterized by a hierarchy of frames in a user interface window. A sub-frame log for a sub-frame in the hierarchy of frames is captured. The log is stored in a top log of a top frame of the hierarchy of frames.

The invention also includes a computer readable storage medium with a dashboard module to build a dashboard for displaying a business metric. A script logger keeps logs associated with a set of frames that define the dashboard.

BRIEF DESCRIPTION OF THE FIGURES

The invention is more fully appreciated in connection with the following detailed description taken in conjunction with the accompanying drawings, in which like reference characters refer to like parts throughout, and in which.

DETAILED DESCRIPTION OF THE INVENTION

Figure 1:
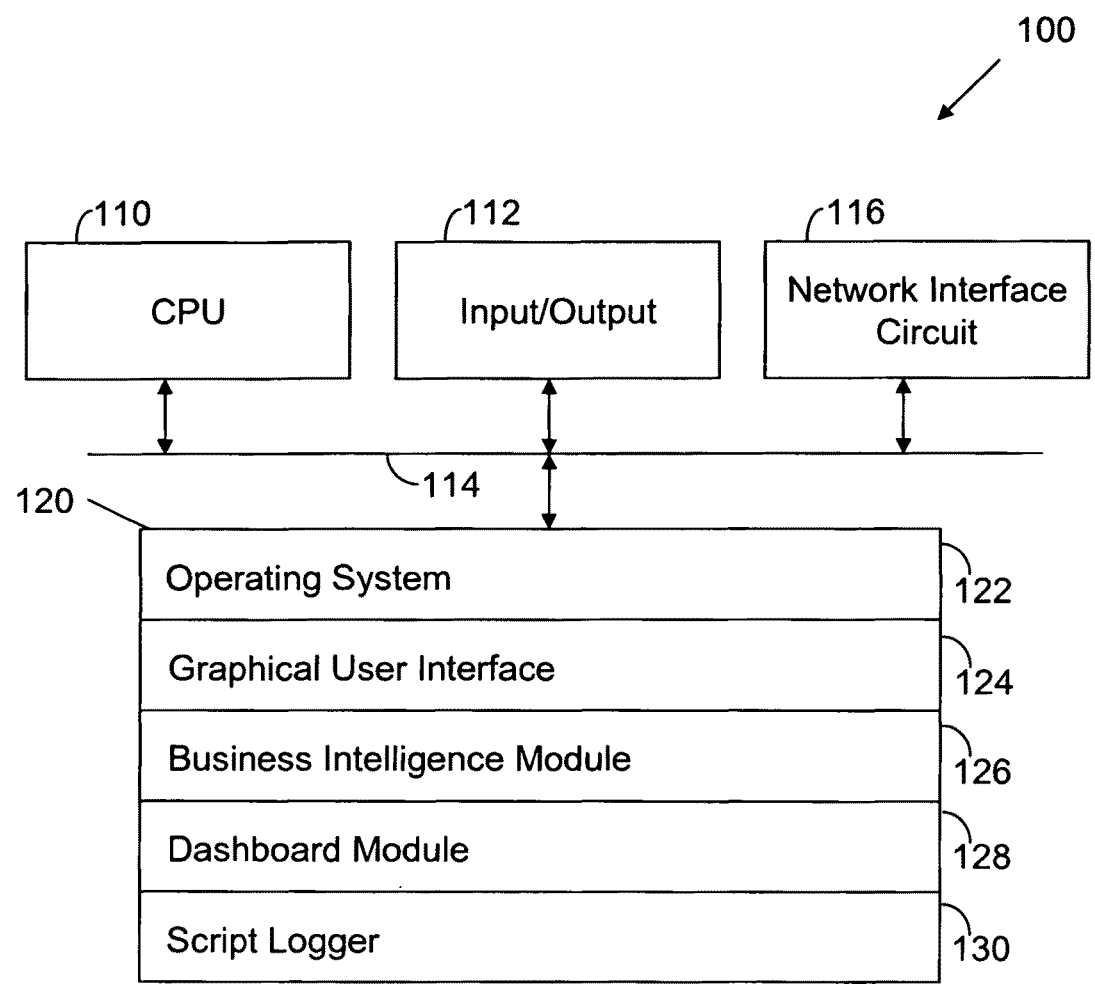
FIG. 1 illustrates a computer constructed in accordance with an embodiment of the invention.

FIG. 1 illustrates a computer 100 configured in accordance with an embodiment of the invention. The computer 100 includes standard components, such as a central processing unit (CPU) 110 and input output devices 112 connected via a bus 114. The input/output devices 112 may include a keyboard, mouse, display, printer and the like. A network interface circuit 116 is also connected to the bus 114 to allow connectivity to a network (not shown). Thus, the computer 100 may operate in a networked environment.

A memory 120 is also connected to the bus 114. In one embodiment, memory 120 stores one or more of the following modules:

an operating system 122,
an optional Graphical User Interface (GUI) 124, a Business Intelligence (BI) module 126,
a dashboard module 128, and
a script logger 130.

Operating system 122 includes instructions for handling various system services, such as file services or for performing hardware dependant tasks. The optional GUI 124 may rely upon standard techniques to produce graphical components of a user interface, e.g., windows, icons, buttons, menu and the like, examples of which are discussed below. BI module 126 includes executable instructions to perform BI-related functions, such as, performing abstract queries and analyses, producing reports, accessing data sources such as relational and/or multidimensional databases, accessing document storage repositories, and the like.

The dashboard module 128 may be a sub-module of the BI module 126 or stand alone. The dashboard module 128 provides Performance Management and Dashboard applications. In accordance with the invention, dashboard module 128 includes executable instructions for retrieving, processing, formatting and displaying business metrics, other quantifiable values, related information and the like.

The script logger 130 is coupled to the dashboard module 128. The script logger 130 includes executable instructions for keeping script logs. A log is created for each frame included in the dashboard application. The script logs are kept even when a frame loads content from a new URI. The script logger includes executable instructions to keep one log as the application user switches to a different workflow. The script logger keeps information for a whole hierarchy of frames. The dashboard module 128 may access and execute executable instructions in the BI module 126.

The executable modules stored in memory 120 are exemplary. It should also be appreciated that the functions of the modules may be combined. In addition, the functions of the modules need not be performed on a single machine. Instead, the functions may be distributed across a network, if desired. Indeed, the invention may be commonly implemented in a client-server environment with various components being implemented at the client-side and/or the server-side. As understood by those of ordinary skill in the art, it is the functions of the invention that are significant, not where they are performed or the specific manner in which they are performed.

Figure 2:
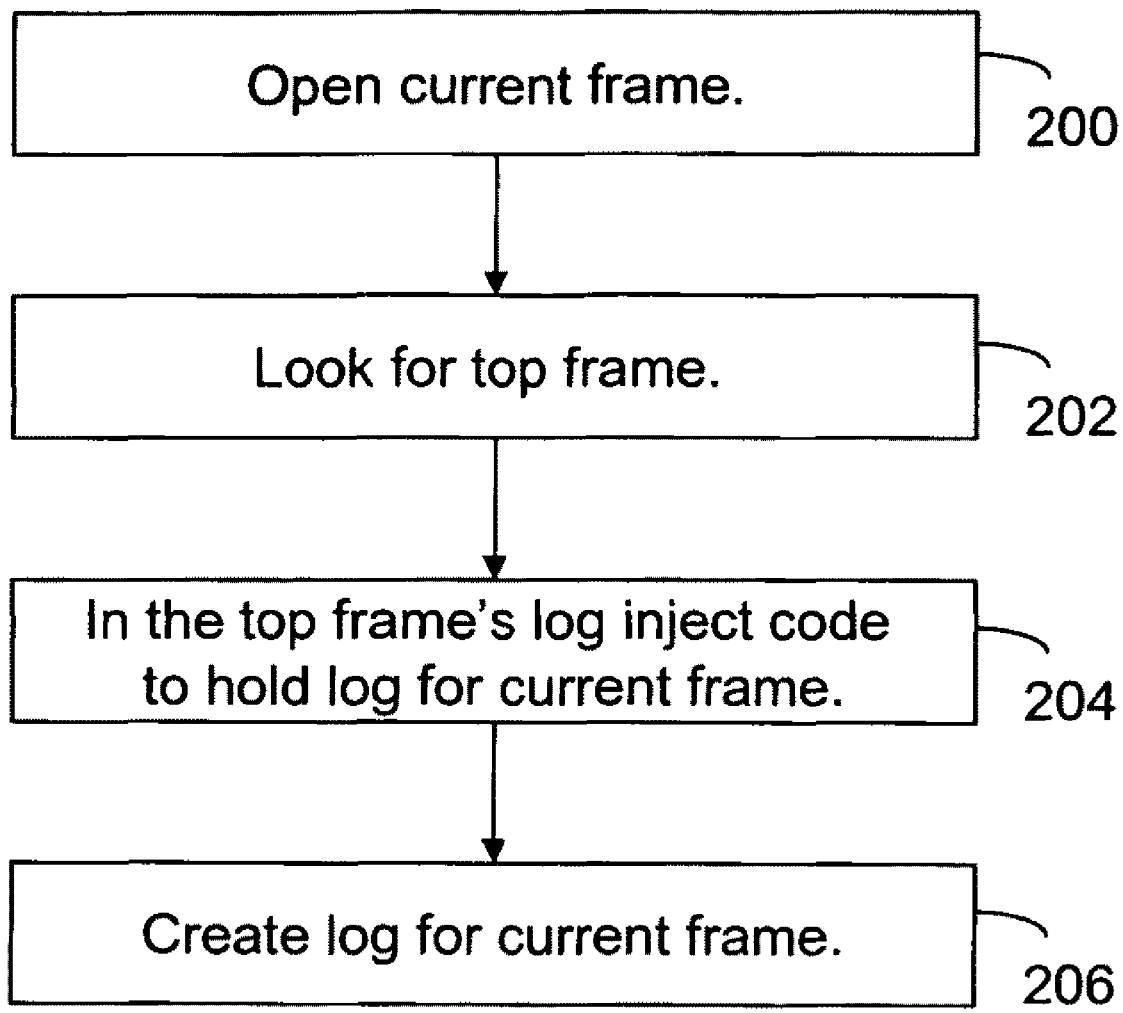
FIG. 2 illustrates a flow chart for creating a log for a hierarchy of frames.

FIG. 2 illustrates processing operations associated with the dashboard module 128 and the script logger 130. The dashboard module opens the current frame 200. The script logger 130 looks for the top frame in the hierarchy of frames 202. The top frame is the frame from which all frames in the application depend from. The top frame can be the current frame. The script logger 130 injects code in the log for the top frame to hold the log for current frame 204. Contents of the current frame are created and kept at the appropriate place in the log for the top frame 206. The contents of the log are standard. The location of the log is a sub-part of the log for the top frame.

The log for the top frame keeps its own log plus a series of logs for the sub-frames depending from it. In an embodiment, the top frame's log includes a link for the log of each sub-frame. This allows the log for each sub-frame to be displayed in a separate window. Each sub-frame's log is keep with the URI or information identifying its source sub-frame as well as a timestamp value allowing a reviewer to know when the log was created. A script logger, such as script logger 130, may keep information about URIs that were previously displayed in a frame but from which a user has already navigated away from. This has advantageous aspects including allowing a log reviewer to trace workflows including cross-frame communication. Further, it allows a reviewer to sort and filter the logs by source frame. A reviewer of a log may be a software developer, dashboard creator, a BI system administrator, a BI vendor customer support person, IT/infrastructure person, and the like.

In an embodiment, additional information can be added to the logs. The additional information can include dividing the logs into trace levels. The levels of tracing could include warnings, errors, and other information. In an embodiment, the logs are transferred to a server side component which stores them.

Figure 3:
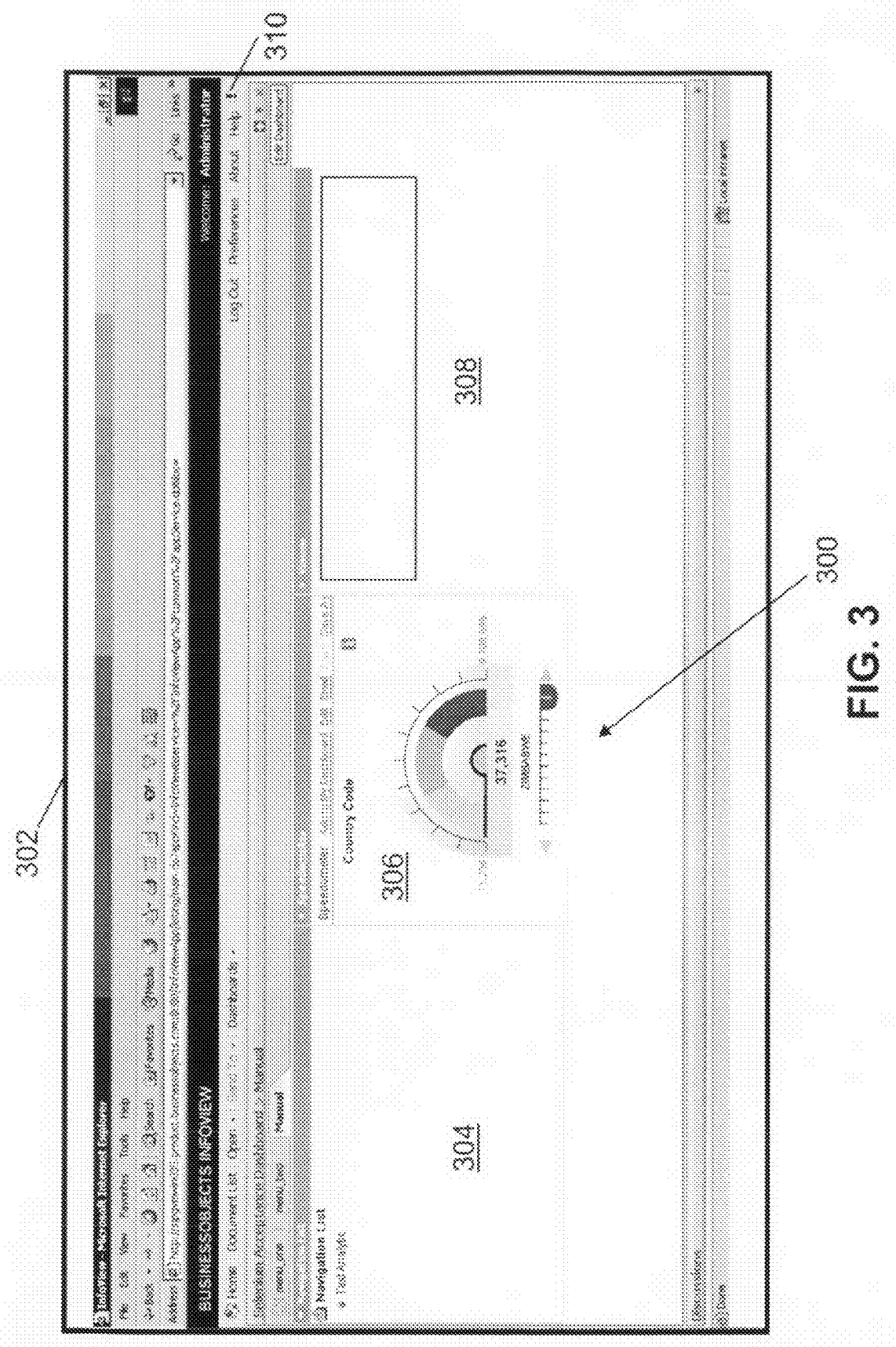
FIG. 3 illustrates an exemplary dashboard for which the invention operates.

FIG. 3 illustrates a dashboard 300. The dashboard 300 is displayed in a web browser window 302. The web browser is an exemplary environment for a dashboard, but any GUI component able to interpret and display the script that defines an application may be used instead. The dashboard includes three frames: a left frame 304 designed to show text, a center frame 306 showing a dial graph, and a right frame 308 designed to display content loaded from another location defined by a URI. The dashboard 300 includes a show log icon 310. When the user clicks on the icon 310, a new browser window opens.

Figure 4:
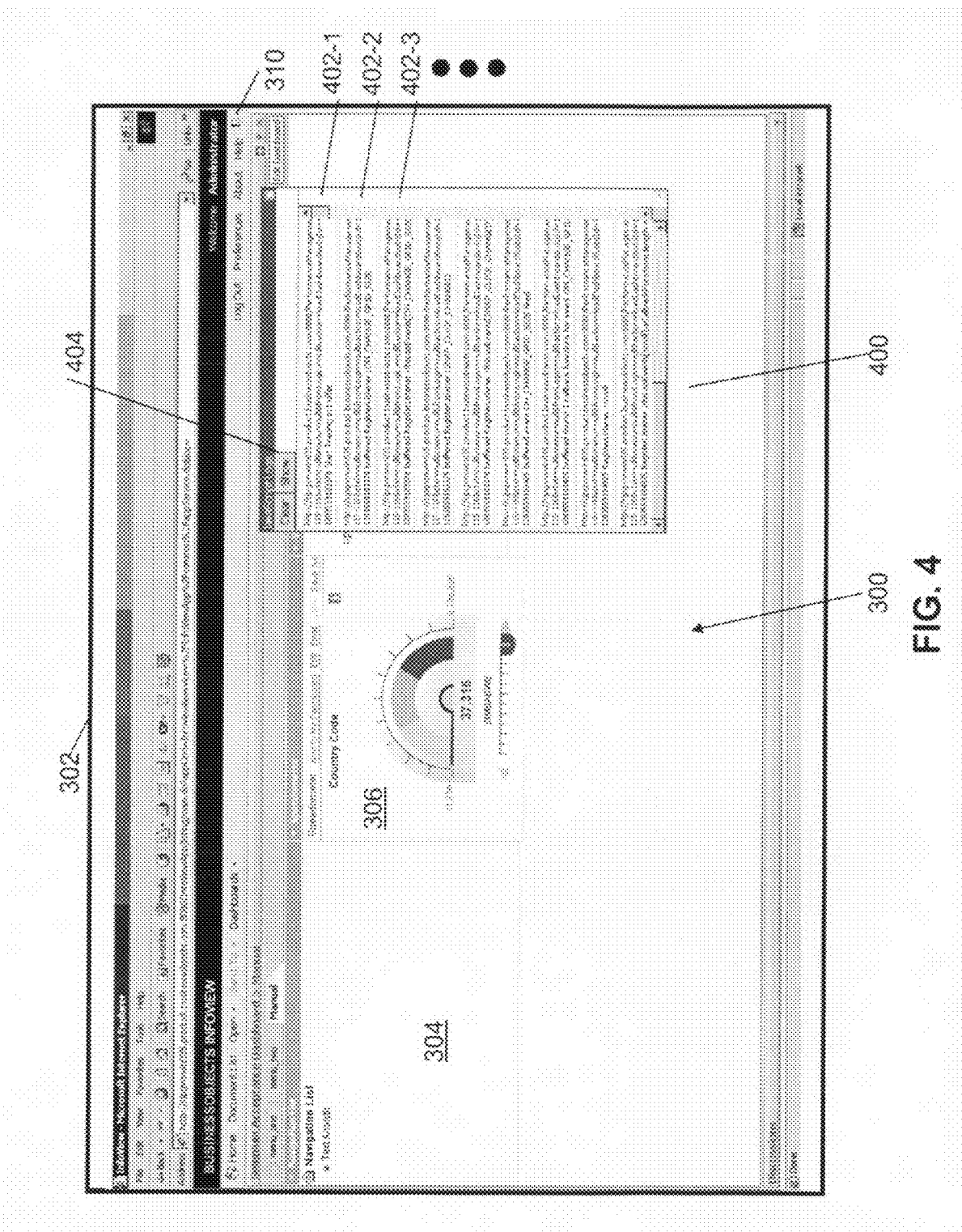
FIG. 4 illustrates an exemplary collection of logs for the dashboard shown in FIG. 3.

FIG. 4 illustrates a new browser window 400. The window 400 includes a set of logs 402 for the current session of the dashboard 300. There are many logs 402-1, 402-2, 403-3, and so on. The set of logs 402 is kept in a top log. The top log is the log of the top frame in a hierarchy of frames that define the dashboard. Each log 402 is for a frame in the hierarchy. Each log includes the URI and a timestamp for the log. A user highlights a log and selects the show button 404.

Figure 5:
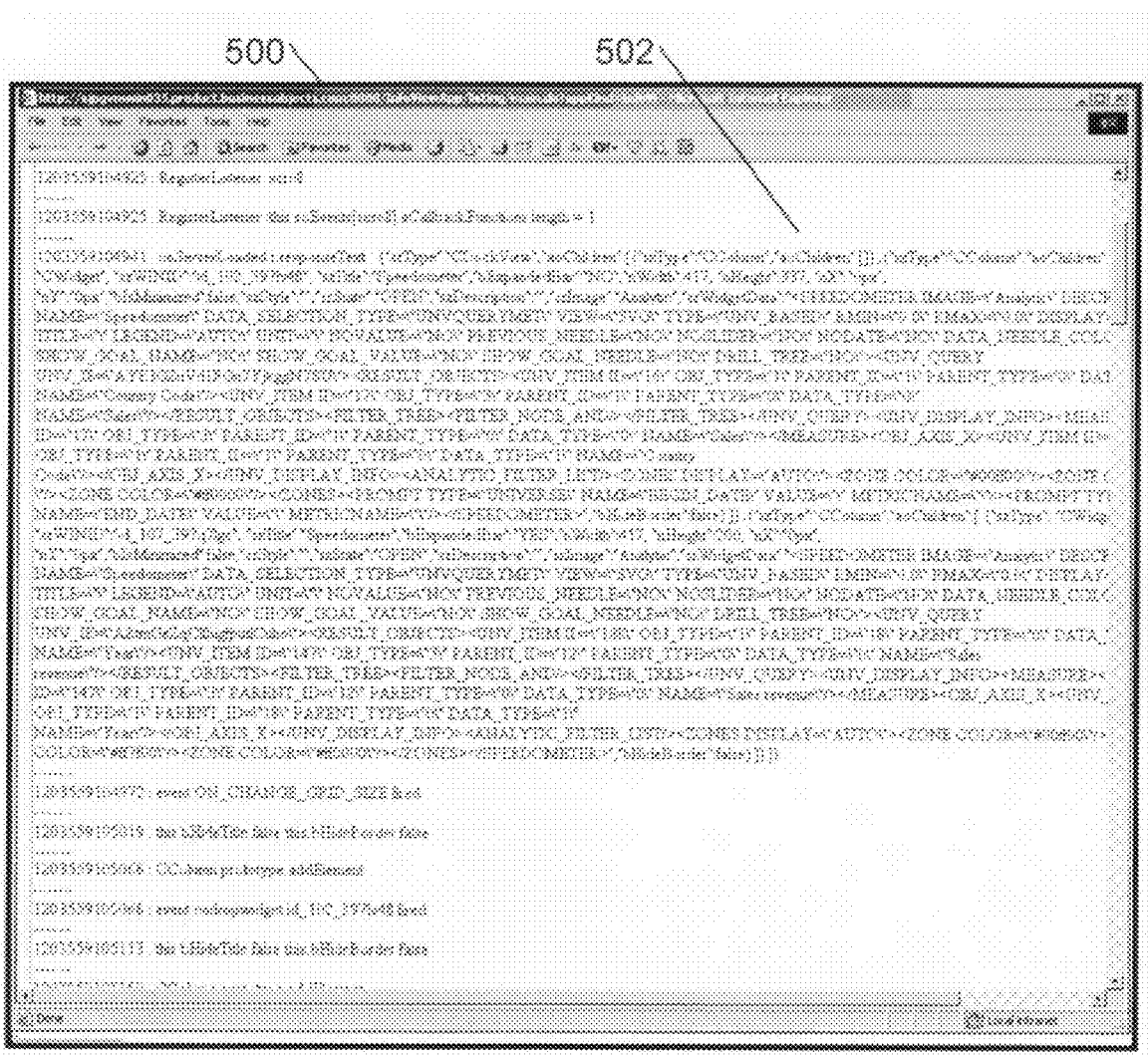
FIG. 5 illustrates the content of a sample log in accordance with an embodiment of the invention.

FIG. 5 illustrates the content of a sample log. A window 500 includes the log 502. The contents of the log are standard and are used as a debugging and development aid. For example the log is a Javascript log. The log 502 is a log to a sub-frame in a hierarchy of frames. The log 502 includes log content associated with loading content from one or more URIs. The log 502 can include log content associated with a plurality of workflows.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
provide a scripting language framework;
run a script within the scripting language framework, wherein the script defines an application characterized by a hierarchy of frames in a user interface window, each frame of the hierarchy of frames associated with a respective frame log;
capture a corresponding frame log for each frame in the hierarchy of frames; and
store each captured frame log in a top frame log of a top frame of the hierarchy of frames.

2. The computer readable storage medium of claim 1 wherein the application is a dashboard displaying a business metric.

3. The computer readable storage medium of claim 1, wherein at least one frame log includes content that is loaded from a first data source associated with a first universal resource identifier to a second data source associated with a second universal resource identifier.

4. The computer readable storage medium of claim 1, wherein information associated with the captured frame log for each frame of the hierarchy of frames is maintained in the top frame log irrespective of whether any frame associated with the captured frame log is closed.

5. The computer readable storage medium of claim 1, wherein information associated with the captured frame log for each frame of the hierarchy of frames is maintained in the top frame log irrespective of whether the captured frame log is lost.

6. The computer readable storage medium of claim 1, wherein the top frame log comprises a frame log of the top frame and frame logs of other frames of the hierarchy of frames.

7. The computer readable storage medium of claim 1, wherein each frame log comprises at least one source of information in the frame log, at least one timestamp associated with the information in the frame log, and tracing information associated with a frame associated with the frame log.

8. The computer readable storage medium of claim 7, wherein:
the source of information is characterized by a uniform resource identifier;
the timestamp is characterized by a time when the frame log is created; and
the tracing information is characterized by at least one or more of warnings and errors associated with the frame associated with the frame log.

9. The computer readable storage medium of claim 1, wherein contents of the top log are configured to be sorted and filtered according to frames.

10. A non-transitory computer readable storage medium, comprising:
a dashboard module to build a dashboard for displaying a business metric, the business metric being displayed using a set of frames, frames of the set of frames comprising a hierarchy; and
a script logger to keep logs associated with the set of frames that define the dashboard, each frame being associated with a respective log of the logs, information associated with each log of the logs being stored collectively in a top log associated with a top frame of the set of frames.

11. The computer readable storage medium of claim 10, wherein the script logger keeps the logs associated with a plurality of workflows, and wherein the stored information in the top log is maintained when a frame other than the top frame of the plurality of hierarchical frames is closed.

12. The computer readable storage medium of claim 10 wherein the script logger associates the logs with a top log for a top frame in the set of frames arranged as a hierarchy.

13. The computer readable storage medium of claim 10 wherein the script logger keeps one log per frame while the frame loads content from multiple universal resource identifiers.

14. The computer readable storage medium of claim 10 wherein the script logger associates a timestamp with each log.

15. The computer readable storage medium of claim 10 wherein the script logger associates a universal resource identifier with each log.

16. A method for implementation by one or more data processors comprising:
providing, by at least one data processor, a plurality of hierarchical frames in a graphical user interface;
determining, by at least one data processor, information for a frame log of a plurality of frame logs, each frame log associated with a frame of the plurality of hierarchical frames; and
storing, by at least one data processor, the information for the frame log associated with each frame in a top frame log of a top frame of the plurality of hierarchical frames, the stored information being maintained when a frame other than the top frame is closed.

17. The method of claim 16, further comprising:
sorting, by at least one data processor, the information stored in the top frame log according to a sorting order associated with the hierarchical frames; and
filtering, by at least one data processor, the sorted information.

18. The method of claim 16, wherein the frame log associated with each frame comprises at least one source of information in the frame log, at least one timestamp associated with the information in the frame log, and tracing information associated with a frame associated with the frame log.

* * * * *